(12) United States Patent
Xiang et al.

(10) Patent No.: US 11,402,867 B2
(45) Date of Patent: Aug. 2, 2022

(54) DISPLAY WORKSTATION USED ON A DESKTOP

(71) Applicant: LOCTEK ERGONOMIC TECHNOLOGY CORP., Ningbo (CN)

(72) Inventors: Lehong Xiang, Ningbo (CN); Tao Lin, Ningbo (CN); Fangyuan Li, Ningbo (CN)

(*) Notice: Subject to any disclaimer, the term of this patent is extended or adjusted under 35 U.S.C. 154(b) by 0 days.

(21) Appl. No.: 16/962,222

(22) PCT Filed: Oct. 11, 2019

(86) PCT No.: PCT/CN2019/110534
§ 371 (c)(1),
(2) Date: Jul. 14, 2020

(87) PCT Pub. No.: WO2020/057670
PCT Pub. Date: Mar. 26, 2020

(65) Prior Publication Data
US 2021/0064080 A1    Mar. 4, 2021

(30) Foreign Application Priority Data
Sep. 21, 2018    (CN) .......................... 201811106412.8

(51) Int. Cl.
*G06F 1/16*    (2006.01)
*G06F 1/18*    (2006.01)

(52) U.S. Cl.
CPC ............ *G06F 1/1607* (2013.01); *G06F 1/189* (2013.01)

(58) Field of Classification Search
CPC ....... G06F 1/1607; G06F 1/1632; G06F 1/189
See application file for complete search history.

(56) References Cited

U.S. PATENT DOCUMENTS

| | | | | |
|---|---|---|---|---|
| 6,004,157 A | * | 12/1999 | Glass | A47B 21/06 439/535 |
| 6,424,525 B1 | * | 7/2002 | MacLeod | G06F 1/16 312/223.1 |
| 9,672,184 B1 | * | 6/2017 | Jain | G06F 11/2733 |
| 9,979,147 B1 | * | 5/2018 | Huang | H01R 25/006 |

(Continued)

FOREIGN PATENT DOCUMENTS

| | | |
|---|---|---|
| CN | 205355733 U | 12/2015 |
| CN | 205913112 U | 2/2017 |
| CN | 108354324 A | 8/2018 |

OTHER PUBLICATIONS

International Search Report and Writen Opinion of PCT/CN2019/110534 dated Jan. 2, 2020.

*Primary Examiner* — Adrian S Wilson
(74) *Attorney, Agent, or Firm* — W&K IP

(57) ABSTRACT

The present disclosure discloses a display workstation used on a desktop, comprising an extension module for connection with a power module in the display workstation, and on the peripheral edge of the display workstation, there provides a detachable connection structure by which the extension module can be placed at different positions of the peripheral edge, as a sliding chute comprised by two guide rails is disposed along the edge of the display workstation and the bends of the sliding chute are in arc transition; the extension module is inserted on the guide rails on the outer side and can be connected to power source while sliding with the guide rails along the sliding chute to the required position.

8 Claims, 5 Drawing Sheets

(56) References Cited

U.S. PATENT DOCUMENTS

| | | | | |
|---|---|---|---|---|
| D869,397 S | * | 12/2019 | Hayes | A47B 9/00 D13/137.2 |
| D911,975 S | * | 3/2021 | Maranto | D13/139.8 |
| D919,338 S | * | 5/2021 | Xiang | D6/649 |
| 2005/0162824 A1 | * | 7/2005 | Thompson | G06F 1/1632 361/679.41 |
| 2008/0059681 A1 | * | 3/2008 | Lodolo | G06F 1/1632 710/303 |
| 2008/0244145 A1 | * | 10/2008 | Kramlich | G06F 1/1632 710/304 |
| 2009/0154079 A1 | * | 6/2009 | Bae | A47B 21/00 361/679.02 |
| 2010/0169531 A1 | * | 7/2010 | Bae | G06F 1/203 710/303 |
| 2010/0192811 A1 | * | 8/2010 | Khalil | G06F 1/1632 108/28 |
| 2010/0216397 A1 | * | 8/2010 | Takasu | G06F 1/1698 455/41.1 |
| 2010/0226088 A1 | * | 9/2010 | Huang | G06F 1/203 361/679.48 |
| 2011/0264927 A1 | * | 10/2011 | Dearborn | G06F 1/1632 713/300 |
| 2012/0170204 A1 | * | 7/2012 | Ahn | G06F 1/1632 361/679.41 |
| 2016/0266607 A1 | * | 9/2016 | Varsanik | H05K 5/02 |
| 2016/0348358 A1 | * | 12/2016 | Udagawa | E04B 2/7422 |
| 2016/0360879 A1 | | 12/2016 | Kelley et al. | |
| 2017/0000254 A1 | * | 1/2017 | Matlin | A47B 9/16 |
| 2017/0060209 A1 | * | 3/2017 | Volek | G06F 1/266 |
| 2017/0123456 A1 | * | 5/2017 | Chung | G06F 1/1632 |
| 2017/0371374 A1 | * | 12/2017 | Carnevali | G06F 1/1632 |
| 2018/0125227 A1 | * | 5/2018 | Xiang | A47B 21/02 |
| 2018/0132636 A1 | * | 5/2018 | Chen | A47B 23/043 |
| 2018/0192769 A1 | * | 7/2018 | Xiang | A47B 21/0314 |
| 2020/0078481 A1 | * | 3/2020 | Xiang | G06F 3/0202 |
| 2020/0133368 A1 | * | 4/2020 | Volek | G06F 1/1632 |
| 2021/0161289 A1 | * | 6/2021 | Xiang | A47B 9/16 |

\* cited by examiner

DISPLAY WORKSTATION USED ON A DESKTOP

CROSS-REFERENCE TO RELATED APPLICATIONS

This application is a 371 of International Patent Application No. PCT/CN2019/110534 with a filing date of Oct. 11, 2019, designating the United States, now pending, and further claims priority to Chinese Patent Application No. 201811106412.8 with a filing date of Sep. 21, 2018. The content of the aforementioned applications, including any intervening amendments thereto, are incorporated herein by reference.

Technical Field

The present invention relates to the technical field of office and learning apparatuses, in particular to a display workstation used on a desktop.

BACKGROUND

A display workstation used on a desktop is also called a display workbench used on a desktop. In practical use, there is typically a display or notebook computer on the workbench.

As automated office and learning apparatuses get widespread, consumers' requirements on the office and learning apparatuses tend to be diverse, by taking the display workstation used on a desktop as an example, besides basic need of supplying power to the display or notebook computer, it is desirable that the display workstation has the capability of wirelessly charging a mobile phone, making use of a USB interface, and supporting connection with a negative ion generator, a loudspeaker, a table lamp, a fan or the like.

However, as far as the existing display workstation used on a desktop is concerned, merely a few of the abovementioned apparatuses can be disposed thereon, with the following drawbacks that power cords are messy to plug in, needed apparatuses are difficultly placed at optimal positions and angles in work or study, a power source is inconvenient to power on, staggered leads cause an unordered desktop, and electricity leakage risk exists after long-term use.

SUMMARY

The technical problem to be resolved by the present invention is to provide a display workstation used on a desktop, featuring satisfying diverse requirements of people on office and learning apparatuses, providing optimal positions and angles for apparatuses, and being convenient to use and clean on desktop.

The technical solution of the present invention provides a display workstation used on a desktop, comprising an extension module for connection with a power module in the display workstation, and on the peripheral edge of the display workstation, there provides a detachable connection structure by which the extension module can be placed at different positions of the peripheral edge.

By adopting the above structure, the display workstation used on a desktop has the following advantages that the extension module can be detachably connected to arbitrary position of the peripheral edge of the display workstation, therefore, staggered leads are avoided, the extension module is capable of meeting diverse requirements of people in work and study, the apparatuses can be placed at optimal positions and angles, use is convenient and desktop is clean, and electricity leakage risk after long-term use is substantially prevented.

In some embodiments, the peripheral edge of the display workstation at least comprises one of the following three edges: a partial left edge, as well as a rear edge and a partial right edge away from a computer operator. The above is merely an embodiment of the detachable connection structure in which position arrangement is reasonable, therefore, requirements on apparatus position and angle can be met no matter in practical work or study, and the operator is prevented from being influenced in operating the computer.

In some embodiments, the extension module is connected with the power module in the display workstation through a lead. The extension module is powered by the power module in the display workstation. After this structure mating with the foregoing embodiment is used, structure becomes simple, and operation is easy and convenient.

In some embodiments, the peripheral edge of the display workstation is provided with a strip-shaped hanging slot for hanging of the extension module. After this structure mating with the forgoing embodiment is used, structure is simple, and operation is easy and convenient.

In some embodiments, a sliding chute comprised by two guide rails and extending along the peripheral edge is formed on the edge of the display workstation. The extension module is inserted on the guide rails and slides to a required position along the sliding chute. This is another embodiment of the detachable connection structure and also the preferred embodiment of the present invention. By adopting this structure, it is convenient and rapid to move the extension module to arbitrary position of the periphery of the display workstation, and firm and stable to stay at arbitrary position.

In some embodiments, the sliding chute is disposed along the partial left edge, as well as the rear edge and the partial right edge away from a computer operator, of the display workstation. Bends of the sliding chute are in arc transition. After this structure mating with the forgoing preferred embodiment is used, position layout is reasonable, requirements on apparatus position and angle can be met no matter in actual work or study, the operator is prevented from being influenced in operating the computer, and the extension module slides smoothly along the sliding chute.

In some embodiments, the extension module is inserted on the guide rails through a plug board. A conductive contact base disposed along the guide rails and connected with the output terminal of the power module in the display workstation is mounted on the guide rails. The plug board is also provided with conductive contacts for power transmission to the extension module from the power module in the display workstation after conducted upon contact with the conductive contact base. By adopting this structure, the extension module moving along the peripheral edge is merely slidably connected with the sliding chute, the conductive contact base of the sliding chute is electrically connected with the power module in the display workstation, that is, the conductive contact base and the power module are in static connection, thereby ensuring reliability and good contact of electric connection, and enabling the extension module to move flexibly and conveniently along the peripheral edge.

In some embodiments, two opposite inner side walls of the guide rails are provided with a conductive strip respectively. The two conductive strips are electrically connected to the output terminal of the power module in the display workstation. Two outer side walls of the plug board contacting the guide rails are provided with a conductive contact respectively. The conductive contacts are in electrical connection to the power input terminals of all functional modules in the extension module. The plug board is inserted at arbitrary position of the guide rails. The conductive contacts are conducted upon contact with the conductive strips. By adopting this structure, reliability and good contact of electric connection are further ensured, and the extension module is flexibly disposed along the peripheral edge.

In some embodiments, the conductive contacts are metal clips. By adopting this structure, reliability and good contact of electric connection and flexibility in movement along the guide rails are further ensured.

The extension module may be configured into one or more of a wireless charging module, a USB interface module, a negative ion generator, a loudspeaker, a table lamp and a fan. The power input terminals of the above modules are electrically connected with the power module in the display workstation through the detachable connection structure. By adopting the above structure, new functional modules are added, so that modules for meeting other requirements (excluding the basic office requirements) can be concentrated on the extension module, and their power supplies are all electrically connected with the power module in the display workstation. Therefore, requirements on new functional modules in work and study are met, staggering of leads is further reduced or avoided, desktop is clean, and electricity leakage risk is further prevented.

Figure 1:
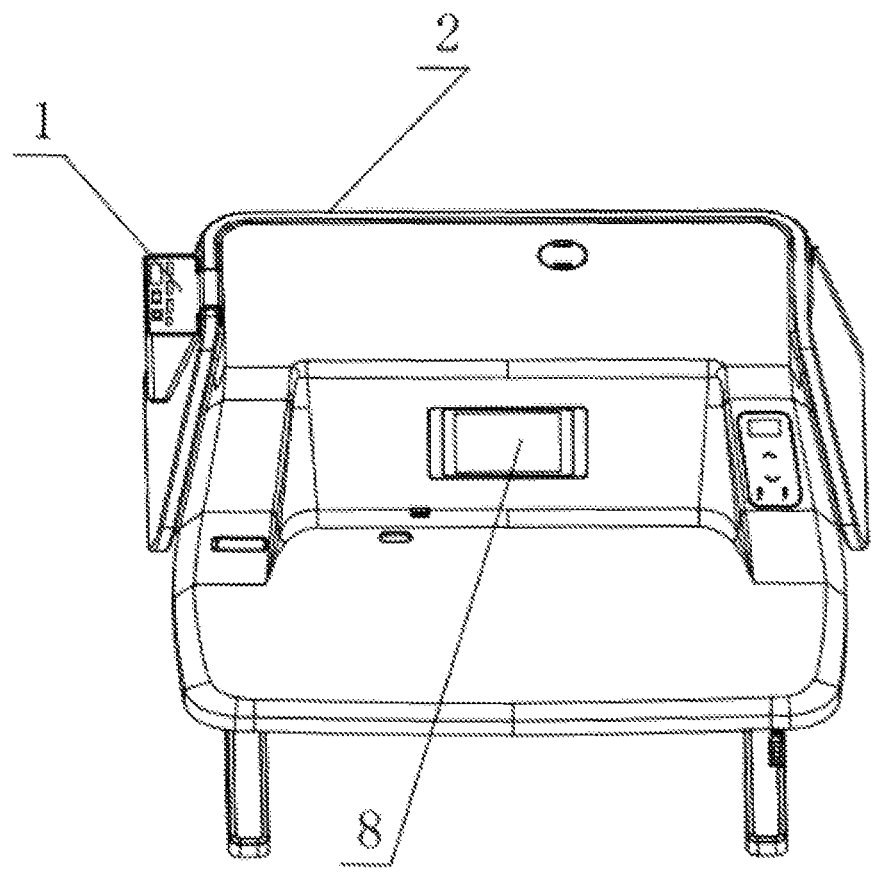
FIG. 1 is a schematically structural diagram of one embodiment of a display workstation of the present invention.

Reference numerals denote: 1 extension module; 2 guide rail; 3 plug board; 4 metal clip; 5 conductive strip; 6 main body; 7 inverted U-shaped slot; 8 display screen; 9 USB interface; 10 wireless charging module; 11 negative ion generator; 12 table lamp.

DETAILED DESCRIPTION OF THE EMBODIMENTS

The present invention will be described in detail with reference to the exemplary embodiments and the accompanying drawings. However, it should be noted that, explanations of these embodiments serve the purpose of helping well understand the present invention, rather than making limitations thereto. Further, the technical features involved in the embodiments described below would be mutually combined provided they do not conflict each other.

Figure 2:
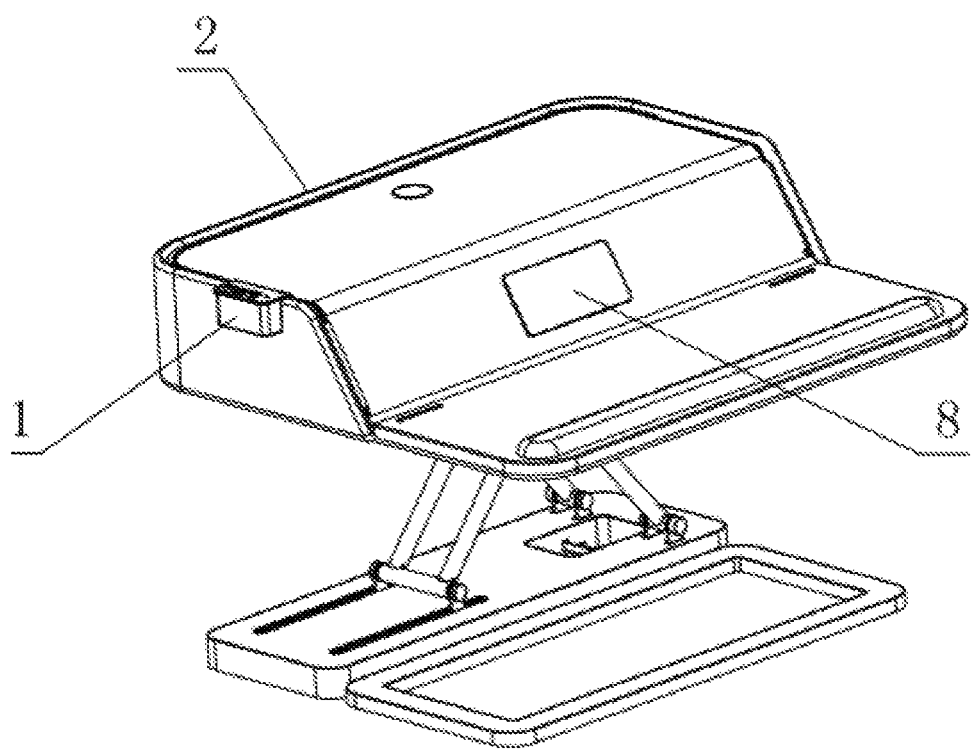
FIG. 2 is a schematically structural diagram of another embodiment of the display workstation of the present invention.
Figure 3:
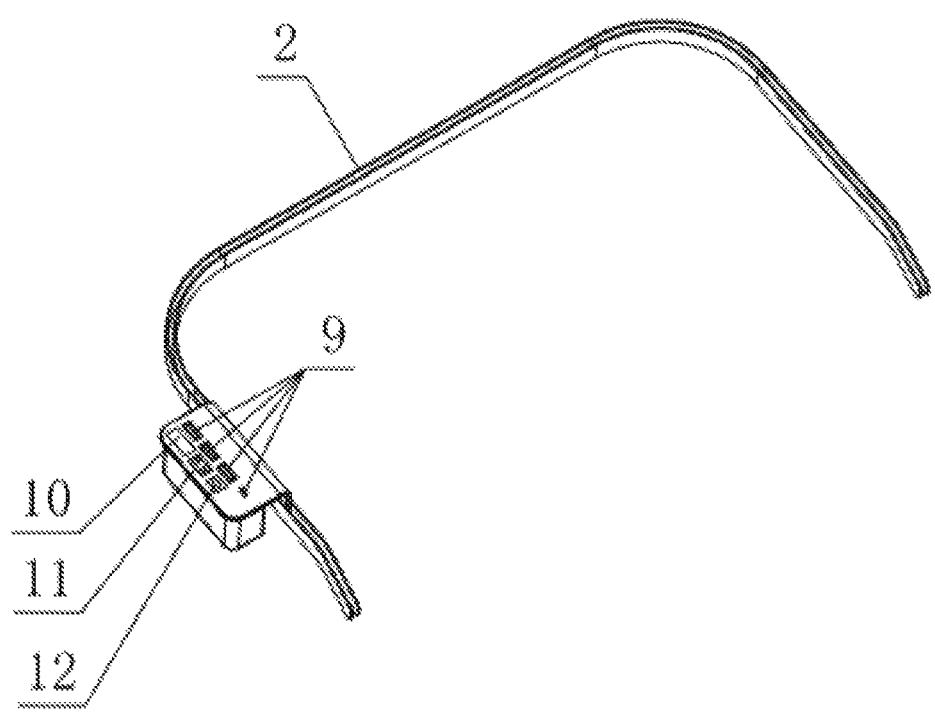
FIG. 3 is a schematically structural diagram about sliding fit of guide rails and an extension module of the present invention.
Figure 4:
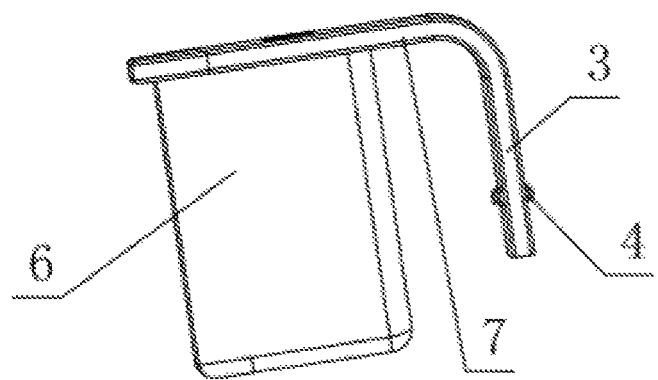
FIG. 4 is a schematically structural diagram of the extension module of the present invention.
Figure 5:
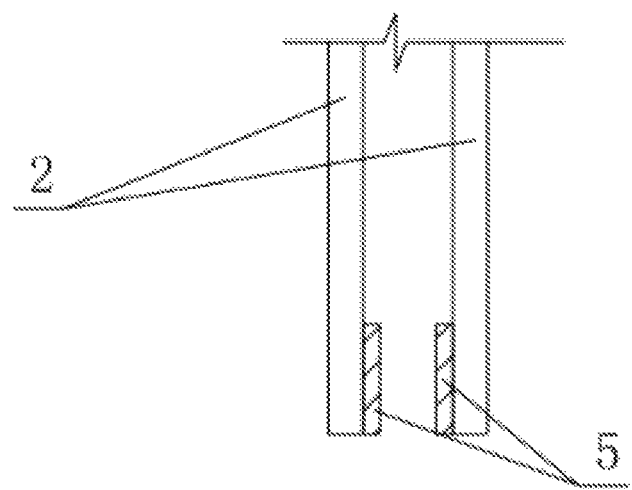
FIG. 5 is a schematically structural diagram of an embodiment in which metal clips on a plug board of the extension module contact conductive strips on the guide rails, of the present invention.

As shown in FIGS. 1-5, the present invention provides a display workstation used on a desktop (also called a display workbench used on a desktop), involving not only a height-unchangeable desktop heightening platform, but also a lifting workbench used on a desktop. The lifting workbench used on a desktop is divided into a hand-driven type and an electric type. The above is collectively called a display workstation used on a desktop. FIGS. 1 and 2 respectively show the display workstation used on a desktop in two different configurations.

On the desktop of the display workstation, a display of a notebook computer or desktop computer is placed. If the display of the desktop computer is mounted, a keypad is often placed on a keypad tray at the lower front portion of the desktop. The extension module may be configured into one or more of a wireless charging module 10, a USB interface module 9, a negative ion generator 11, a loudspeaker, a table lamp 12 and a fan (these modules are called functional modules). The power input terminals of the above modules are electrically connected with the power module in the display workstation through the detachable connection structure. The detachable connection structure refers to such a structure that is connected through leads or a structure of first contacting conductive contacts with the conductive contact base and then connecting through leads.

Besides meeting the basic power supply need in work or study, for example, the display and keypad of a desktop computer or a notebook computer are/is directly connected into the mains supply, that is, the display and keypad of a desktop computer or a notebook computer are/is directly electrically connected into an AC power, the above extension module also can meet requirements on other multifunctional apparatuses in work and study, e.g., charging a mobile phone, purifying air around the desktop, lightening with a table lamp, cooling with a mini fan, externally connecting a power supply with a USB interface, listening to music with a loudspeaker, etc. The wireless charging module 10, negative ion generator 11, table lamp 12, fan, USB externally-connected power supply and sound are proven prior art. For example, the fan is often a mini type, which is retractable as disclosed in the prior art, to be specific, it extends out when in use, and retracts back when not in use. After use of an LED, the table lamp 12 in the prior art is small in size, and has good directivity. The table lamp also can be retractable as disclosed in the prior art, to be specific, it extends out when in use, and retracts back when not in use. The negative ion generator 11 or desktop air purifier is also proven prior art, with the advantages of small size and capability of being concentrated on an extension module having multiple interfaces. The wireless charging module 10 like a wireless charging coil in a charging base is also developed prior art, can be used for charging small portable electronic equipment such as a mobile phone, a camera and the like, for instance, a charging base is often used to wirelessly charge a mobile phone, the wireless charging coil, i.e., an electric energy transmitting coil is disposed in the charging base, while the supported receiving coil is mounted in electronic equipment like a mobile phone, the charging base provided with the wireless charging coil is also integrated on the extension module 1 of the display workstation, a DC power mini sound if used can be also disposed on the desktop separately, and direct current is transmitted through the USB interface.

The present invention provides a display workstation used on a desktop. On the peripheral edge of the display workstation, there provides a detachable connection structure by which the extension module 1 can be placed at different positions of the peripheral edge. Preferred embodiments are descried as follows:

a sliding chute comprised by two guide rails 2 and extending along the peripheral edge is formed on the edge of the display workstation. The extension module 1 is inserted on the guide rails 2 and slides to a required position along the sliding chute.

The sliding chute is disposed along the partial left edge, as well as the rear edge and the partial right edge away from a computer operator, of the display workstation. Bends of the sliding chute are in arc transition.

The extension module 1 is inserted on the guide rails 2 through a plug board 3. A conductive contact base disposed along the guide rails 2 and connected with the output terminal of the power module in the display workstation is mounted on the guide rails 2. The plug board 3 is also provided with conductive contacts for power transmission to the extension module from the power module in the display workstation after conducted upon contact with the conductive contact base. Current output from the power module in the display workstation is either alternating current (AC) or direct current (DC).

Two opposite inner side walls of the guide rails 2 are provided with a conductive strip 5 that is a specific structure of the conductive contact base, respectively. The two conductive strips 5 are electrically connected to the output terminal of the power module in the display workstation through leads. Two outer side walls of the plug board 3 contacting the guide rails 2 are provided with a conductive contact, respectively. The conductive contacts are in electrical connection to the power input terminals of all functional modules in the extension module. The plug board 3 is inserted at arbitrary position of the guide rails 2. The conductive contacts are conducted upon contact with the conductive strips 5. The conductive contacts are metal clips 4.

The main body 6 of the extension module 1 is positioned at the outer side, and an inverted U-shaped slot 7 is formed between the main body 6 and the plug board 3 integrated with the main body 6, and is hung on an outermost guide rail 2 of the two guide rails 2 at the outer side. A roller rolling on the outermost guide rail 2 also can be provided on the top wall of the inverted U-shaped slot 7 of the extension module 1, so that it is labor-saving for the roller to move along the guide rails 2.

The guide rails 2 are made of a non-conductive material, such as insulated plastics. The spacing between the two guide rails 2 is equal in width in peripheral length. The two outer sides of the bottom end of the plug board 3 of the extension module 1 are provided with positive and negative metal clips 4 that are connected with the positive and negative poles of functional modules in the extension module 1, that is, a positive metal clip is connected with a positive pole like a positive copper sheet of each functional module, a negative metal clip is connected with a negative pole like a negative copper sheet of each functional module in the extension module 1 through leads. A through hole for a lead to pass through is permissible in the plug board 3.

The metal clips 4 and the conductive strips 5 preferably have the following structure: the conductive strips 5 may be strip-shaped copper sheets stuck on inner side faces of the bottom ends of the guide rails 2, the metal clip 4 may be a semicircular ring of which two ends are secured on the bottom end of the plug board 3 by sticking or threaded connection, and the middle projects toward and abuts against a strip-shaped wafer. As the plug board 3 slides, the tops of the semicircular rings always elastically contact the strip-shaped copper sheets. Besides, copper sheets at two ends of the semicircular rings are respectively provided with a circular through hole, and axially limited at the bottom end of the plug board 3 through locking screws. However, a proper spacing such as 1 mm between the copper sheets and the plug board 3 is allowable. A compressed spring or coil spring may be disposed on the plug board 3 and the semicircular ring, therefore, elastic contact effect is good. The metal clips 4 and the conductive strips 5 may have another structure: the conductive strips are strip-shaped copper channels which are in threaded connection or clamping connection on inner side faces of the bottom ends of the guide rails and of which the cross sections are arc-shaped grooves. The metal clips are elastic electrodes, such as copper spring plungers embedded in and adhered to blind holes at the bottom end of the plug board. As the plug board slides, the tops of the copper spring plungers always elastically contact the strip-shaped copper channels. The metal clips and the conductive strips may still have another structure: the metal clips refer to copper rollers slidably fit on a copper shaft at the bottom end of the plug board, the conductive strips are semi-annulus copper strip-shaped rails, with such a cross section that two ends are stuck on or screw jointed on the inner side faces at the bottom ends of the guide rails but the middle projects toward and abuts against the copper roller. As the plug board slides, the copper rollers always elastically contact the copper strip-shaped rails. A compressed spring or coil spring positioned between the copper shaft and the bottom end of the copper shaft is allowable. Therefore, elastic contact effect is good.

On the peripheral edge of the display workstation, there provides a detachable connection structure by which the extension module 1 can be placed at different positions of the peripheral edge. The following embodiments are selectable: the peripheral edge of the display workstation comprises the following three edges: a partial left edge, as well as a rear edge and a partial right edge away from a computer operator. The peripheral edge of the display workstation is provided with a strip-shaped hanging slot for hanging of the extension module. The extension module is connected with the power module in the display workstation through leads. The extension module is powered by the power module in the display workstation. The left, rear and right peripheral walls of the display workstation are provided with multiple threaded round holes or are respectively provided with a threaded elongated hole for passing through of the leads whereby the extension module and the power module in the display workstation are electrically connected.

The detachable connection structure between the extension module and the peripheral edge of the display workstation may be disclosed in another embodiment: a row of hooks are secured on left, rear and right peripheral edges of the display workstation, and hanging holes for hanging on the hooks are formed on the extension module. Each pair of positive and negative poles in the extension module are connected with the positive and negative output terminals of the power module in the display workstation, left, rear and right peripheral walls of the display workstation may have multiple threaded round holes or are respectively provided with a threaded elongated hole for passing through of the leads whereby the extension module and the power module in the display workstation are electrically connected.

Of course, if the display workstation comprises both an alternating current (AC) power module, and a direct current (DC) power module, the circumstance that two extension modules are hung on the guide rails on the peripheral edge is not excluded, with one extension module electrically connected with the AC power module in the display workstation, and the other one electrically connected with the DC power module in the display workstation.

In the display workstation, the side plate facing to the computer operator is provided with a display screen 8 that is electrically connected with the local area network (LAN). The electric connection may refer to signal connection, i.e., data connection, and the power supply can be connected with that in a workbench. Or signal connection and power connection are uniformly controlled by an entity. By adopting the above structure, information, such as internal notices in entities, cautions in work or study, major international/national news, calendar, time, weather, temperature and the like, required in work, study or entertainment may be displayed in a rolling type in time. Therefore, the display workstation has high practicability.

The described above is merely the preferred embodiments of the present invention, and is not restrictive to the present invention. For those skilled in the art, any modifications and variations to the embodiments of the present invention will be appreciated. Thus, it is intended that the present invention covers any modifications, equivalent substitutions or improvements made to the embodiments provided they come within the spirit and principle of the present invention.

We claim:

1. A display workstation used on a desktop, comprising an extension module for connection with a power module (1) in the display workstation, wherein the peripheral edge of the display workstation is provided with a detachable connection structure by which the extension module can be placed at different positions of the peripheral edge;

wherein a sliding chute comprised by two guide rails (2) and extending along the peripheral edge is formed on the edge of the display workstation; the extension module (1) is inserted on the guide rails (2) and slides to a required position along the sliding chute;

wherein the extension module (1) is inserted on the guide rails (2) through a plug board (3); a conductive contact base arranged along the guide rails (2) and connected with the output terminal of the power module (1) in the display workstation is mounted on the guide rails (2); the plug board (3) is also provided with conductive contacts for power transmission to the extension module (1) from the power module in the display workstation after conducted upon contact with the conductive contact base.

2. The display workstation used on a desktop of claim 1, wherein the peripheral edge of the display workstation at least comprises one of the following three edges: a partial left edge, a rear edge and a partial right edge away from a computer operator.

3. The display workstation used on a desktop of claim 1, wherein the extension module (1) is connected with the power module in the display workstation through a lead and the extension module (1) is powered by the power module in the display workstation.

4. The display workstation used on a desktop of claim 1, wherein the peripheral edge of the display workstation is provided with a strip-shaped hanging slot for hanging of the extension module (1).

5. The display workstation used on a desktop of claim 1, wherein the sliding chute is disposed along the partial left edge, the rear edge and the partial right edge away from a computer operator of the display workstation and the bends of the sliding chute are in arc transition.

6. The display workstation used on a desktop of claim 1, wherein the two opposite inner side walls of the guide rails (2) are provided with a conductive strip (5) respectively, and the two conductive strips (5) are electrically connected to the output terminal of the power module in the display workstation; the two outer side walls of the plug board (3) contacting the guide rails (2) are provided with a conductive contact respectively; the conductive contacts are in electrical connection to the power input terminals of all functional modules in the extension module (1); the plug board (3) is inserted at arbitrary position of the guide rails (2); the conductive contacts are conducted upon contact with the conductive strips (5).

7. The display workstation used on a desktop of claim 6, wherein the conductive contacts are metal clips.

8. The display workstation used on a desktop of claim 1, wherein the extension module (1) is configured into one or more of a wireless charging module (10), a USB interface module (9), a negative ion generator (11), a loudspeaker, a table lamp (12) and a fan; the power input terminals of the above modules are electrically connected with the power module in the display workstation through the detachable connection structure.

* * * * *